United States Patent Office 3,513,170
Patented May 19, 1970

1

3,513,170
PREPARATION OF 2,2,6,6-TETRAMETHYL-4-OXOPIPERIDINE
Keisuke Murayama, Syoji Morimura, Toshimasa Toda, Eiko Yamao, Tomizi Tsuzi, Susumu Higashida, and Osamu Amakasu, Tokyo, Japan, assignors to Sankyo Company Limited, Tokyo, Japan
No Drawing. Filed July 19, 1967, Ser. No. 654,361
Claims priority, application Japan, July 23, 1966, 41/48,272, 41/48,274
Int. Cl. C07d 29/20
U.S. Cl. 260—294.7         2 Claims

ABSTRACT OF THE DISCLOSURE

Novel and improved process for the preparation of 2,2-dimethyl-4-oxo-6,6-disubstitutedpiperidine derivatives which comprises reacting diacetone alcohol with ammonia and ketone derivative in the presence of a Lewis acid.

Novel and improved process for the preparation of 2,2,6,6-tetramethyl-4-oxopiperidine which comprises reacting 2,2,4,4,6-pentamethyl-2,3,4,5-tetrahydropyrimidine with a Lewis acid in the presence of water. These 2,2-dimethyl-6,6-disubstituted-4-oxopiperidines, including the known 2,2,6,6-tetramethyl-4-oxopiperidine, are useful as intermediates for the synthesis of light stabilizer for polyolefins.

---

This invention relates to improvement in preparation of certain 4-oxopiperidine compounds and also to a new class of certain 2,2,6,6-tetrasubstituted-4-oxopiperidine compounds.

More particularly, it is concerned with a novel and improved process for the preparation of the 4-oxopiperidine compound having the formula:

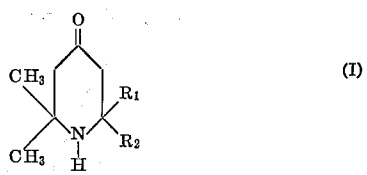

wherein:
$R_1$ and $R_2$, which may be the same or different, represent alkyl group or they may be joined together with the carbon atom to which they are attached to form a saturated 5- or 6-membered homocyclic ring, or the group of the formula:

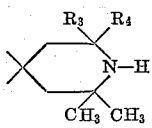

or of the formula:

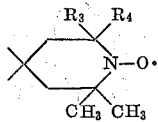

(wherein $R_3$ and $R_4$, which may be the same or different, represent alkyl group or they may be joined together with the carbon atom to which they are attached to form a saturated 5- or 6-membered homocyclic ring).

In the above Formula I, each of the groups $R_1$ and $R_2$ may be illustrated by the following groups; methyl, ethyl, n-propyl, isopropyl, n-butyl, isobutyl, hexyl, octyl, decyl, dodecyl and the like. The cyclic groups formed by the groups $R_1$ and $R_2$ may be illustrated by the following groups;

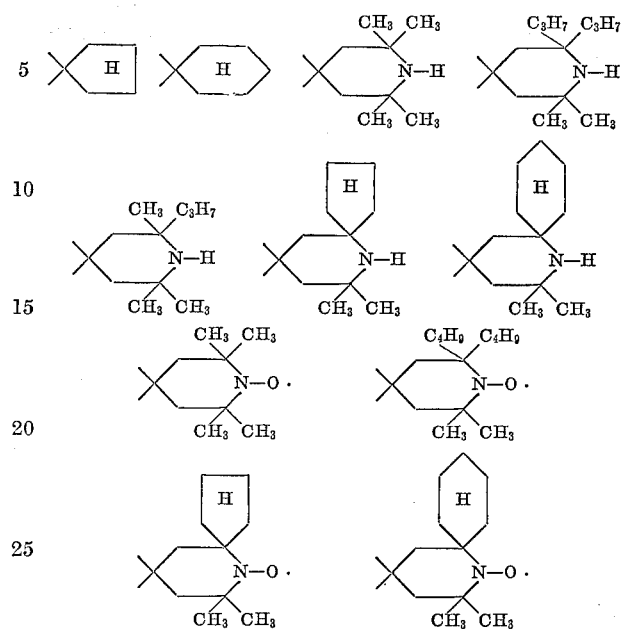

The 4-oxopiperidine compounds of the above Formula I which may be satisfactorily obtained according to the process of this invention are novel compounds unknown in the prior art with exception of the 4-oxopiperidine wherein both of the groups $R_1$ and $R_2$ are methyl, i.e. 2,2,6,6-tetramethyl-4-oxopiperidine. These 4-oxopiperidine compounds of the above Formula I are useful as intermediates for the synthesis of certain piperidine-N-oxides. Such piperidine-N-oxides are found to be new and valuable light stabilizers for various types of polyolefins. More advantageous procedures for the production of such piperidine-N-oxides from the 4-oxopiperidine compounds (I) obtained according to the process of this invention are fully disclosed and claimed in our copending application such as U.S. patent application Ser. No. 596,755 and No. 642,678. These descriptions incorporated herein are as a reference. Some of the above-indicated procedures are given hereinbelow solely for the purpose of illustration. For instance, the 4-oxopiperidine (I) can be converted in a manner known per se, namely with a peroxide to the corresponding 4-oxopiperidine-1-oxide having the formula:

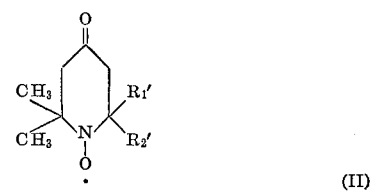

(II)

wherein $R_1'$ and $R_2'$, which may be the same or different, represent alkyl group or they may be joined together with the carbon atom to which they are attached to form a saturated 5- or 6-membered homocyclic ring or the group of the formula:

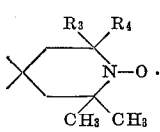

(wherein $R_3$ and $R_4$ are as defined above). Then, the 4-oxipiperidine-1-oxide (II) can be subjected to reaction with the amine derivatives having the formula $$H_2N-R_5-Y$$

wherein $R_5$ represents alkylene group, cycloalkylene group, arylene group, arylene-amino group or arylene-diamino group and Y represents hydrogen atom or amino group to form the piperidine-1-oxide having the formula:

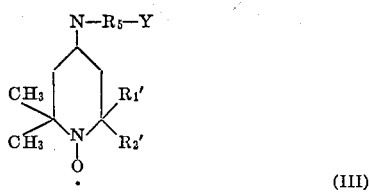

(III)

wherein $R_1'$, $R_2'$, $R_5$ and Y are as defined above, which are found useful as light stabilizers for polyolefins.

In accordance with another procedure, another valuable stabilizer the piperidine-N-oxide having the formula:

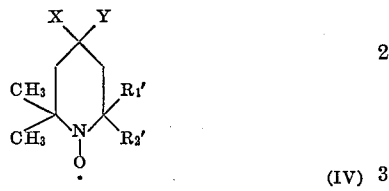

(IV)

wherein:

X is cyano group or carbamoyl group; and
Y is hydroxy group or the group of the formula:

(wherein $R_6$ and $R_7$, which may be the same or different, are hydrogen, alkyl group, aryl group or aralkyl group or, jointly together with the nitrogen atom to which they are attached, form a saturated 5- or 6-membered heterocyclic ring which may be further interrupted by any hetero atom other than the N-atom); provided that, when X is cyano or carbamoyl group, Y is hydroxy group, and when X is cyano group, Y is the group

can be obtained by (A) reacting the 4-oxopiperidine-1-oxide having the above Formula II(a) with hydrogen cyanide or (b) with an alkali metal bisulfite to form the corresponding addition compound followed by the reaction of the latter compound with hydrogen cyanide or an alkalimetal cyanide, thereby to form a compound having the formula:

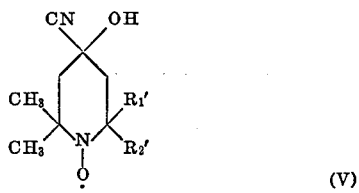

(V)

wherein $R_1'$ and $R_2'$ are as defined above; (B) reacting the compound having the above Formula V with a compound having the formula:

where $R_6$ and $R_7$ are as defined above, thereby to form a compound having the formula:

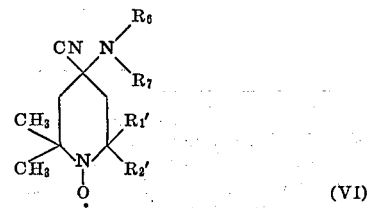

(VI)

wherein $R_1'$, $R_2'$, $R_6$ and $R_7$ are as defined above; or (C) (a) reacting the 4-oxopiperidine having the above Formula I with hydrogen cyanide or with an alkali metal bisulfite to form the corresponding addition compound followed by the reaction of the latter compound with hydrogen cyanide or an alkali metal cyanide, thereby to form a compound having the formula:

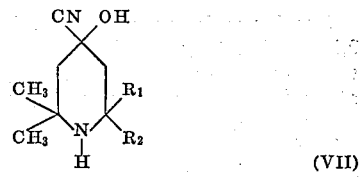

(VII)

wherein $R_1$ and $R_2$ are as defined above, and then (b) treating the latter compound with a peroxide, thereby to form a compound having the formula:

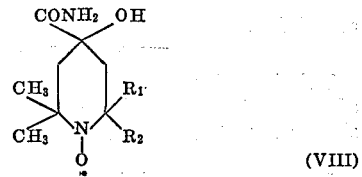

(VIII)

wherein $R_1$ and $R_2$ are as defined above.

According to still another procedure, another valuable light stabilizer, the piperidine-N-oxide having the formula:

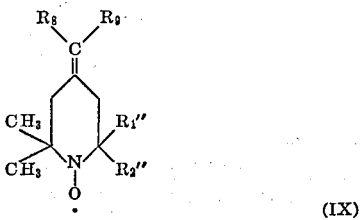

(IX)

wherein $R_1''$ and $R_2''$, which may be the same or different, are alkyl group and $R_8$ and $R_9$, which may be the same or different, are cyano group, carboxyl group, alkoxycarbonyl group, carbamoyl group, aliphatic or aromatic acyl group or aryl group can be obtained by (A) reacting the 4-oxopiperidine having the formula:

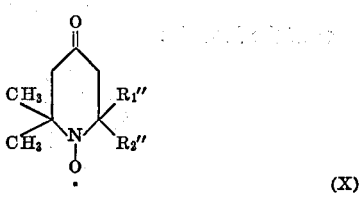

(X)

wherein $R_1''$ and $R_2''$ are as defined above with a compound having the formula:

wherein $R_8$ and $R_9$ are as defined above in the presence of a basic condensing agent or (B) reacting the 4-oxopiperidine having the formula:

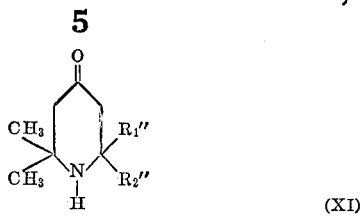
(XI)

wherein $R_1''$ and $R_2''$ are as defined above with a compound having the formula:

$$R_8—CH_2—R_9$$

wherein $R_8$ and $R_9$ are as defined above in the presence of a basic condensing agent to form a compound having the formula:

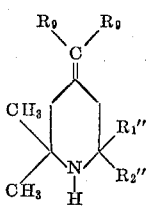
(XII)

wherein $R_1''$, $R_2''$ $R_8$ and $R_9$ are as defined above and treating the latter product thus obtained with a peroxide to form a compound having the formula:

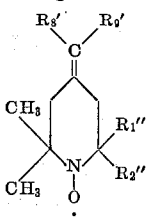
(XIII)

wherein $R_1''$ and $R_2''$ are as defined above and $R_8'$ and $R_9'$, which may be the same or different, are carboxyl group, alkoxycarbonyl group, carbamoyl group, aliphatic or aromatic acyl group or aryl group.

Of the 4-oxopiperidine compounds of the above Formula I, as is explained above, there has been already proposed in the prior art 2,2,6,6-tetramethyl-4-oxopiperidine and also several procedures for the production of such compound. As representative and possibly advantageous procedures there have been recommended in the art the following two ways; this is, (1) the procedure comprising passing ammonia gas through acetone in the presence of calcium chloride [H. K. Hall, Jr., J. Am. Chem. Soc., 79, 5444 (1957)], and (2) the procedure comprising reacting ammonia with phorone (diisopropylidene acetone derived from aceton) [W. Heintz, Ann. 203, 336 (1880)].

These prior procedures have, however, some serious drawbacks, especially in the yield of the final product and thus would not be considered as commercially utilizable. For example, the above procedure described by H. K. Hall, Jr. produces the desired 4-oxopiperidine in a low yield of only approximately 20%, the reaction period being so long period of time as about 7 days, accompanying with a considerable amount of various by-products in the product so that complicated purification procedures should be repeated many times. On the other hand, the another prior procedure reported by W. Heintz has such disadvantages as poor total yield (generally, less than about 20%) of the final product due to the difficulty in obtaining the starting phorone from acetone in a good yield (about 30%, at the best) and the like. Moreover, there is no possibility of obtaining those 4-oxopiperidine of the above Formula I wherein $R_1$ and $R_2$ are the abovedefined groups other than $CH_3$, in accordance with the prior art procedures.

Now, it has been unexpectedly found that the 4-oxopiperidine derivative of the above Formula I can be easily and advantageously prepared by reacting diacetone alcohol with ammonia and the ketone derivative having the formula:

(XIV)

wherein $R_1$ and $R_2$ are as defined above in the presence of a Lewis acid, and also that the 4-oxopiperidine derivative of the above Formula I wherein both $R_1$ and $R_2$ represent methyl group, i.e. 2,2,6,6-tetramethyl-4-oxopiperidine may be alternatively prepared by reacting 2,2,4,4,6-pentamethyl - 2,3,4,5 - tetrahydropyrimidine represented by the formula:

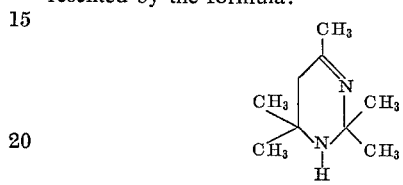

with a Lewis acid in the presence of water ($H_2O$).

The new and improved process of this invention as disclosed above will be illustratively represented by the following reaction scheme.

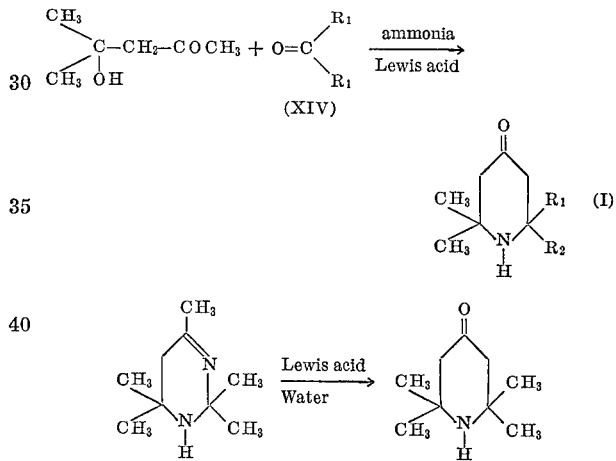

In the above reaction scheme, $R_1$ and $R_2$ are as defined above.

It is, accordingly, a principal object of this invention to provide a new and improved process for the preparation of the 4-oxopiperidine derivatives of the above Formula I which are useful as intermediates for the synthesis of a number of novel piperidine-N-oxides having a great utility as light stabilizers for polyolefins. It is another object of this invention to provide novel 4-oxopiperidine derivatives of the above Formula I wherein $R_1$ and $R_2$ are the above-defined group other than methyl group, which derivatives are valuable intermediates for the synthesis of new light stabilizers.

These objects and advantages of this invention will be apparent from the following detailed description.

In one embodiment in the process of this invention wherein the 4-oxopiperidine derivatives of the above Formula I can be obtained, the reaction can be preferably conducted by introducing ammonia to a mixture of diacetone alcohol, a ketone derivative (XIV) and a suitable Lewis acid. Representative examples of the Lewis acid which may be employed as a catalyst in this embodiment include zinc chloride, calcium chloride, tin chloride, aluminum chloride, boron trifluoride, picric acid and the like. Preferably, there may be employed zinc chloride and calcium chloride.

In this embodiment, ammonia may be employed in the form of gas and gaseous ammonia can be generally passed or bubbled through the reaction mixture for about 3-8 hours. It is preferable to introduce gaseous ammonia into the reaction mixture intermittently at any interval, since it is not desirable in this reaction that an excessively large amount of ammonia would be suddenly retained in situ.

The reaction solvent is not always required in this reaction, but it is preferable to employ such suitable inert organic solvents as benzene, ether and the like in order that the introduction of ammonia gas may be satisfactorily conducted.

The reaction in this embodiment may be generally conducted at ordinary temperature, but it is preferable to introduce ammonia gas into the reaction mixture with cooling to about 0–15° C. and then, after completion of the introduction of ammonia gas, heat the reaction mixture at 40–50° C. with stirring for several hours, thereby to promote the reaction proceeding. After completion of the reaction, the desired product may be more easily recovered from the reaction mixture by a conventional means. For instance, when calcium chloride is employed as a Lewis acid in this embodiment, white crystalline inorganic materials precipitate out and the solid phase and the liquid phase are present in the reaction mixture as two distinctly separated layers. The liquid phase is then decanted and, after drying, subjected to distillation under reduced pressure to give the desired product in a purified form.

The starting material to be employed in this embodiment, i.e. diacetone alcohol can be easily prepared in a high yield (more than 80%) from acetone according to the known technique (see "Organic Synthesis" Collective vol. 1, 199).

In another embodiment in the process of this invention wherein 2,2,6,6-tetramethyl-4-oxopiperidine can be obtained, there may be similarly and satisfactorily utilized any of those Lewis acids as illustrated in the above embodiment. There may be preferably employed zinc chloride, calcium chloride, picric acid and the like. The reaction may be generally conducted at ordinary temperature, but it may be desirable to heat the reaction mixture at about 50° C. in order to promote the reaction proceedings. The reaction period is not critical and may vary over a wide range mainly depending upon the type of the Lewis acid employed. For instance, where zinc chloride or calcium chloride is employed, the reaction is effected for about 10 minutes to about 20 hours and, where picric acid is employed, the reaction is completed in several minutes. The reaction solvent is not always required, but there may be desirably employed such inert organic solvents as benzene, acetone, methanol, ethanol, ether and the like. The presence of water in the reaction system is essential feature in this embodiment, and there may be suitably employed at least 2 molar equivalent of water (as $H_2O$) based upon the starting pyrimidine employed. Also, excess water may be employed as a reaction solvent.

After completion of the reaction, the desired product may be recovered from the reaction mixture by a conventional means. For instance, the reaction mixture is made alkaline by addition of a suitable alkali metal hydroxide such as sodium hydroxide, extracted with a suitable water-immiscible organic solvent such as ether and then the extract is dried over anhydrous sodium sulfate.

After removal of the solvent, the residue is subjected to distillation under reduced pressure to give the desired product.

In accordance with the process of this invention, there may be given various advantages, as compared with the prior art process. Especially, not only the desired product of the above Formula I can be obtained in a higher yield (generally, ca. 45–65%) in a relatively short reaction period (generally, about 30–40 hours), but there may be readily produced in a good yield other new 4-oxopiperidine compounds which are impossible to be provided by the prior art technique and may be employed as useful intermediates for the synthesis of more effective new light stabilizers. In addition, the starting material to be employed in the process of this invention, i.e. diacetone alcohol and 2,2,6,6-tetramethyl-4-oxopiperidine may be easily prepared in a high yield according to the known procedures (namely, "Organic Synthesis" Collective vol. 1, 199, more than 80% yield for the former and J. Chem. Soc. 1947, 1394, ca. 90% yield for the latter, respectively).

For clearer understanding of this invention, there are given the following examples. These examples are shown only for the purpose of illustration and should not be construed to be limiting the scope of this invention.

EXAMPLE 1

Preparation of 2,2,6,6-tetramethyl-4-oxopiperidine

A mixture of 30.8 g. of 2,2,4,4,6-pentamethyl-2,3,4,5-tetrahydropyridmidine and 14.7 g. of calcium chloride dihydrate in 1.8 g. of acetone and 3 ml. of water was made under ice-cooling and then allowed to be warmed to room temperature. Thereafter the mixture was heated under reflux with stirring for 13 hours. After completion of the reaction, to the reaction mixture was added 30 ml. of 50% aqueous sodium hydroxide. The resulting mixture was extracted several times with ether. The combined extracts were dried over anhydrous potassium carbonate and spbjected to distillation under reduced pressure to give 20.7 g. of the crude product, boiling at 95–99° C./15 mm. Hg. The crude product thus obtained was crystallized with ice-cooling and the crystalline substance (19.2 g.) was then recovered by filtration thereby to yield the desired product in a pure form. M.P. 35–36° C. Yield, 62.0%.

EXAMPLE 2

Preparation of 2,2,6,6-tetramethyl-4-oxopiperidine

Ther were admixed with ice-cooling 50 g. of 2,2,4,4,6-pentamethyl-2,3,4,5-tetrahydropyrimidine, 24 g. of zinc chloride, 20 g. of acetone and 6 ml. of water. Then, the resulting mixture was allowed to be warmed to room temperature and heated under reflux with stirring for 13 hours. After completion of the reaction, the reaction mixture was treated in the same manner as in the above Example 1 to give 29.3 g. of the desired product. Yield, 58.3%.

EXAMPLE 3

Preparation of 2,2,6,6-tetramethyl-4-oxopiperidine

To a solution of 50 g. of 2,2,4,4,6-pentamethyl-2,3,4,5-tetrahydropyrimidine in 10 ml. of 99% ethanol was added ethanol saturated with picric acid (16 g.). The resulting mixture was heated at 80° C. for 2–3 minutes and then allowed to stand at room temperature for a while. The crystalline substances comprising ammonium picrate and 2,2,6,6-tetramethyl-4-oxopiperidine picrate were recovered by filtration and then subjected to fractional crystallization to give the desired product (in the form of a picrate) as yellow needles (7 g. 56%) melting at 175–176° C. The picrate thus obtained was then converted to the corresponding free base by treatment of the former with hydrochloric acid, removal of the precipitate by filtration, extraction of the filtrate with ether after being made alkaline and then removal of the ether by distillation.

EXAMPLE 4

Preparation of 2,2,6,6-tetramethyl-4-oxopiperidine

To 200 g. of diacetone alcohol was added with vigorous stirring successively 100 g. of powdery calcium chloride and 100 g. of acetone. Through the resulting mixture was gently bubbled ammonia gas for 1 hour while cooling to 0–5° C. and then the additional ammonia gas bubbling was intermittently repeated five times at intervals of 3 hours, each bubbling being conducted for 1 hour. Thereafter, the mixture was warmed with stirring to 40–50° C. for 15 hours. The liquid layer was separated by decantation and the residual precipitate so obtained was washed several times with ether. The liquid layer and the washings were combined and the resulting mixture was subjected to distillation under reduced pressure, after drying over potassium carbonate, to give 145 g. (53.3%) of the desired product, boiling at 70–74° C./46 mm. Hg.

EXAMPLE 5

Preparation of 2,2,6-trimethyl-4-oxo-6-isobutylpiperidine

To 12 g. of diacetone alcohol was added with stirring 6 g. of powdery calcium chloride and 10 g. of methyl isobutyl ketone. The resulting solution was cooled to 10–15° C. and then through the solution was bubbled ammonia gas in the same manner as in the above Example 4. After completion of the reaction, the reaction mixture was treated in the same manner as in the above Example 4 to give 9.6 g. (48.3%) of the desired product, boiling at 68° C./16 mm. Hg.

Analysis.—Calculated for $C_{12}H_{21}ON$ (percent): C, 73.04; H, 11.75; N, 7.10. Found (percent): C, 72.87; H, 11.88; N, 7.21.

EXAMPLE 6

Preparation of 1-aza-2,2-dimethyl-4-oxo-spiro-(5.5) undecane

To 12 g. of diacetone alcohol was added with stirring 8 g. of zinc chloride and 98 g. of cyclohexanone. The resulting solution was cooled to 0–5° C. and then through the solution was bubbled ammonia gas in the same manner as in the above Example 4. After completion of the reaction, the reaction mixture was treated in the same manner as in the above Example 4 to give 12.3 g. (63.2%) of the desired product, boiling at 108–110° C./0.6 mm. Hg.

Analysis.—Calculated for $C_{12}H_{21}ON$ (percent): C, 73.79; H, 10.84; N, 7.17. Found (percent): C, 73.46; H, 10.99; N, 7.02.

EXAMPLE 7

Preparation of 1,9-diaza-2,2,8,8,10,10-hexamethyl-4-oxo-spiro (5.5) undecane

To 12 g. of diacetone alcohol was added with stirring 6 g. of powdery calcium chloride and 15.5 g. of 2,2,6,6-tetramethyl-4-oxopiperidine. Through the resulting solution was bubbled ammonia gas in the same manner as in the above Example 4. After completion of the reaction, the reaction mixture was treated in the same manner as in the above Example 4 to give the desired product in the form of a liquid boiling at 140–145° C./3 mm. Hg, which product was then crystallized with cooling and recrystallized from methanol to yield the desired product in the form of a pure crystalline substance, melting at 69.5–70.5° C. Yield 11.4 g. (45.1%).

Analysis.—Calculated for $C_{15}H_{28}ON_2$ (percent): C, 71.38; H, 11.18; N, 11.10. Found (percent): C, 71.27; H, 11.19; N, 11.29.

Similarly, there were obtained the following product:

2,2-dimethyl-4-oxo-6,6-diisobutylpiperidine;
2,2,6-trimethyl-4-oxo-6-n-hexylpiperidine;
6-aza-7,7-dimethyl-9-oxo-spiro(4.5)decane; and
1,9-diaza-2,2,8,8,10,10-hexamethyl-4-oxo-spiro (5.5) undecane-9-oxide.

What is claimed is:
1. A process for preparing 2,2,6,6-tetramethyl-4-oxopiperidine which comprises reacting 2,2,4,4,6-pentamethyl-2,3,4,5-tetrahydropyrimidine with a Lewis acid in the presence of water.
2. A process according to claim 1, wherein said Lewis acid is calcium chloride, zinc chloride or picric acid.

References Cited

UNITED STATES PATENTS 3,126,393  3/1964  Young.
1,473,285  11/1923  Fisher.

FOREIGN PATENTS 230,745  8/1958  Australia.

HENRY R. JILES, Primary Examiner
S. D. WINTERS, Assistant Examiner

U.S. Cl. X.R.

260—45.8, 251, 294, 294.3